United States Patent [19]

Emanuelson

[11] Patent Number: 4,679,853
[45] Date of Patent: Jul. 14, 1987

[54] SEAT BELT ANCHORAGE

[75] Inventor: Bjorn Emanuelson, Vargarda, Sweden

[73] Assignee: Autoliv Development AB, Vargarda, Sweden

[21] Appl. No.: 803,805

[22] Filed: Dec. 2, 1985

[30] Foreign Application Priority Data

Dec. 3, 1984 [GB] United Kingdom ............... 8430468

[51] Int. Cl.$^4$ .............................................. B60R 21/02
[52] U.S. Cl. ..................................... 297/468; 24/637; 24/643; 280/801
[58] Field of Search ............... 24/643, 647, 635, 636, 24/637; 297/468; 280/801

[56] References Cited

U.S. PATENT DOCUMENTS

| 3,142,102 | 7/1964 | Saunders | 297/468 |
| 3,238,587 | 3/1966 | Goinard | 24/643 |
| 3,500,510 | 3/1970 | Gaione | 297/468 |
| 3,521,333 | 7/1970 | Dunster | 24/637 |
| 3,852,854 | 12/1974 | Sigrud et al. | 24/637 |
| 4,047,267 | 9/1977 | Lindblad | 297/468 |
| 4,110,847 | 9/1978 | Dera | 24/647 |
| 4,300,789 | 11/1981 | Matsuoka et al. | 280/801 |
| 4,468,843 | 9/1984 | Duclos et al. | 24/635 |

Primary Examiner—Victor N. Sakran
Attorney, Agent, or Firm—Spencer & Frank

[57] ABSTRACT

A seat belt anchorage consists of a support member which forms part of a carriage movable along a track. The support member is adapted to have a seat belt releasably connected thereto. The seat belt itself engages a connection member, one end of which is engaged by a spring-biassed catch member. The other end of the connection may either be pivotally connected to the support member or may be inserted into a socket or recess defined on the support member. The catch can be moved to a release position to enable the seat belt to be detached from the carriage.

21 Claims, 3 Drawing Figures

SEAT BELT ANCHORAGE

BACKGROUND OF THE INVENTION

The present invention relates to a seat belt anchorage.

When a person in a motor vehicle wears a seat belt, and the motor vehicle is involved in an accident, it is possible for the motor vehicle to come to rest on its roof, or in some other unusual position with the person suspended by the seat belt and unconscious, or incapacitated in some other way. People rescuing the person from the motor vehicle must first release the seat belt. If the seat belt is retained only by a releasable buckle located in the centre of the motor vehicle it may be very difficult, and time consuming, to release the seat belt and, in such a situation, minutes can make the difference between life and death.

The present invention seeks to provide a seat belt anchorage which can be released, in the case of an emergency. The seat belt anchorage of a preferred embodiment of the invention is adapted to anchor one end of a seat belt.

BRIEF SUMMARY OF THE INVENTION

According to the present invention there is provided a seat belt anchorage comprising a support menans, a first member, means for connecting the first member to the support means, the said first member being adapted to have part of the seat belt secured thereto or retained thereby, and a second member movably connected to the support means, having an initial position in which it engages the first member to retain the first member in a latched position in which it is secured to the support means, thus effectively connecting said part of the seat belt secured thereto or retained thereby to the support means, the second member being movable to a second position in which it releases the first member, thus permitting the said part of the seat belt to be disengaged from the support member.

Preferably the said second member is pivotally mounted on the support member and is spring biased to the initial position.

Advantageously the support means is formed on a carriage movable along a track or rail mounted in a motor vehicle.

In one embodiment of the invention said means for connecting the first member to the support means comprises a pivot pin or the like located adjacent one end of the first member pivotally connecting said one end of the first member to the support means so that a free end of the first member can pivot about a predetermined axis.

Preferably the first member is spring biassed towards a released position.

Conveniently the first member has a cam surface which engages part of the second member when the first member is moved from the released position towards the position in which it is retained by the second member, thus moving the second member against the spring bias, the second member being adapted to move under the bias to the initial position again when the first member is in its retained position, so that the second member again retains the first member.

Advantageously the means spring biassing the first member comprise a spring provided to engage the said pivotally mounted first member and the support means, the spring being adapted to provide a rotational bias to the first member, biassing the first member towards the released position.

Preferably the first member defines a channel extending between the pivoted end and the free end thereof, the channel being adapted slidingly to receive an element provided at one end of a seat belt to secure the seat belt to the said first member.

Advantageously the support means comprises a single support plate.

In a second embodiment of the invention the said means for connecting the first member to the support means comprise means on the support means defining a socket or recess adapted to receive a protrusion provided on the first member.

Conveniently the means defining said socket or recess comprise a loop-shaped member which is secured to the support means, the socket or recess being defined within said loop, said loop means being pivotally connected to the support means.

Advantageously the second member comprises means defining a socket or recess adapted to accommodate a protrusion provided on the first member and is in the form of a saddle member which is pivotally connected to the support means, the saddle member being spring biassed towards said initial position by means of a spring engaging the saddle member and engaging the support means.

Preferably the first member is spring biassed towards the release position by means of an ejector member which is pivotally mounted on the support means, and which is associated with a spring biassing means.

Conveniently the spring biassing means biassing the ejector is the same spring that biasses said second member.

Advantageously the support means comprises a plurality of adjacently located support plates.

INTRODUCTION TO THE DRAWINGS

DESCRIPTION OF PREFERRED EMBODIMENTS

Figure 1:
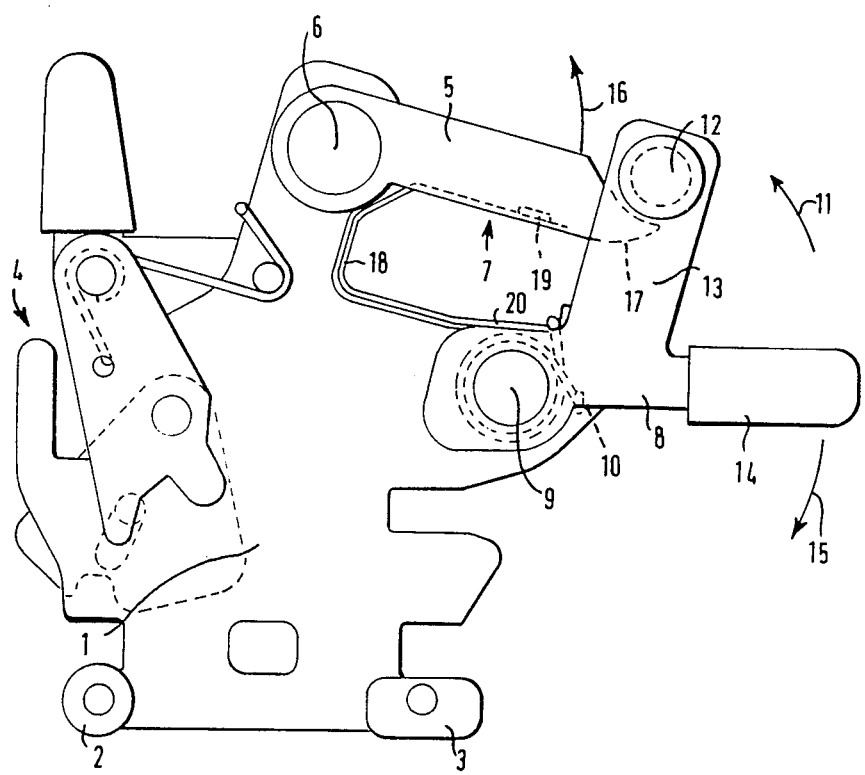
FIG. 1 is an elevational view of one embodiment of the invention.

Referring initially to FIG. 1 a support member 1 is shown. The support member is in the form of a carriage adapted to move along a rail or track mounted in a motor vehicle. The support member 1 has laterally extending portions 2, 3 which engage an undercut groove formed in the track. The support member is also provided with a latching means 4 which is provided to enable the support member to be latched in position in an appropriate locking station provided at a predetermined position along the track. The precise nature of the latching means 4 is not of direct importance to the present invention and thus will not be described here.

The support member 1 has pivotally connected thereto a first member 5 which is an elongate member. One end of the member 5 is mounted on a pivot shaft 6 which is connected to the support member. Thus the first member 5 can pivot about the axis of the shaft 6. The first member 5 defines, on its undersurface 7, a groove or channel which may be of "T" configuration, designed to receive a correspondingly shaped element provided at one end of a seat belt. When the element provided at the end of the seat belt has been slidingly inserted into the channel that end of the seat belt is securely connected to the first member 5.

A second member 8 is pivotally connected to the support member 1 about a pivot axis 9. A spring 10 is provided which engages the member 8 and the support member 9 and serves to bias the second member 8 upwardly in a direction shown by the arrow 11. The member 8 consists of two identically shaped plates, one located at each side of the substantially planar support element 1. A transverse rod 12 interconnects the plates in the upper region of one arm 13 that forms part of the second member 8. The arm 13 is connected to a rearwardly extending arm 14 which constitutes a manually operable part of the second element 8.

The seat belt anchorage will initially be in the condition as illustrated in FIG. 1, with a seat belt connected to the first member 5. It will be seen that the first member 5 is retained in position since the transverse rod 12 engages the free end of the first member 5. The second member 8 is biassed into the position illustrated by means of the spring 10.

If it is wished to release the seat belt from the anchorage, the manually operable arm 14 of the second member 8 may be moved downwardly, as indicated by the arrow 15, thus moving the second member 8 against the bias provided by the spring 10. The transverse rod 12 will thus move away from the free end of the first member 5. The first member 5 may then move upwardly in the direction illustrated by the arrow 16, and the element provided at the end of the seat belt may be slidingly disengaged from the slot formed in the first member 5.

Once the second member 8 is released it will return to the position illustrated in FIG. 1. If the first member 5 is then moved downwardly back towards the position illustrated in FIG. 1 a sloping cam surface 17 provided adjacent the free end thereof will initially engage the transverse rod 12 interconnecting the two plates constituting the member 8. Because of the nature of the cam surface 17 the member 8 will be moved against the spring bias, thus permitting the first member to continue its downward movement until it again occupies the position illustrated in the accompanying drawing. The second member 8 will then return to the condition illustrated in FIG. 1 under the influence of the biassing spring 10.

It is to be appreciated that, if desired, the first member 5 may be spring biassed towards a released position, that is to say may be spring biassed to move in the directin of the arrow 16 when released, by means of a leaf spring. A leaf spring 18 is illustrated having one end thereof 19 secured to the undersurface 7 of the arm, and having the other end 20 thereof secured to the support member 1.

It will be appreciated that when a support member as described above is utilised in a motor vehicle, the support may be utilised at one end of the belt or, alternatively, may be used in a position on or adjacent the "B" post of a motor vehicle, in the case of a front seat passenger. In the event of an accident a rescuer may be able to obtain access to the second member 8, pivoting the second member to release the seat belt from the first member 5, thus releasing the seat belt. It may thus be possible to rescue a person rapidly from a motor vehicle, which may be very important, especially if a person is seriously injured, or if the vehicle catches fire.

Figure 2:
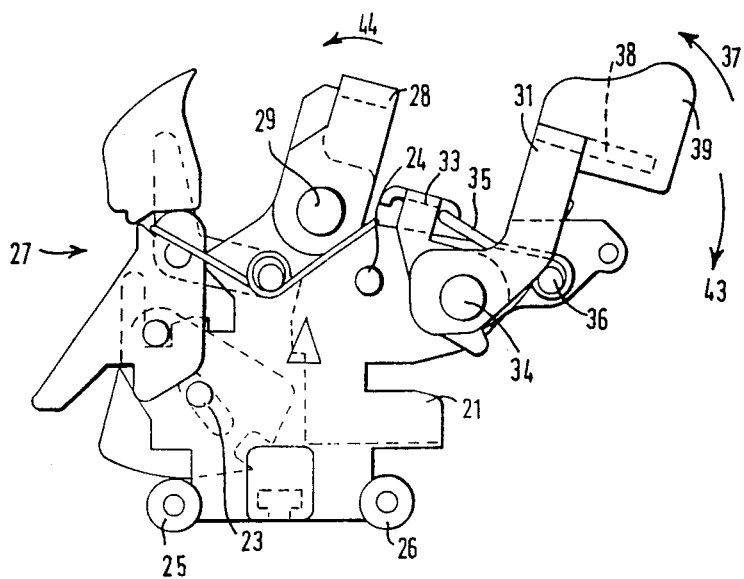
FIG. 2 is an elevational view of a second embodiment of the invention.

Referring now to FIG. 2 a support member 21 is shown. As can be seen from FIG. 3 two such support members are provided and a similar support member 22 is located between the two members 21. A pin 23 connects the two members 21 whilst a further pin 24 serves to connect the two members 21 with member 22. The support members 21 are in the form of a carriage adapted to move along a rail or track mounted in a motor vehicle. The support members 21 have laterally extending portions 25, 26 which engage an undercut groove formed in the track. The support members are also provided with a latching means 27 which is provided to enable the support members to be latched in position in an appropriate locking station provided at a predetermined position along the track. The precise nature of the latching means 27 is not of direct importance to the present invention and thus will not be described here.

The support members have connected thereto a loop member 28 which defines a socket or recess. The open end of the member 28 is mounted on the support members by way of a pin 29 passing through bores 30 in the open end of the member 28, and through corresponding bores in the support members. Thus the member 28 can pivot about the axis of the pin 29.

A second member 31 in the form of a saddle member, defining a socket or recess is pivotally connected to the support members about a pivot axis 32. An ejector member 33 is also pivotally connected to the support members about the same pivot axis 32 and is located within the arms of the member 31, the arrangement being retained in position by a pin 34. A spring 35 is provided which engages the member 31 and the member 33 and is mounted by way of a pin 36 on the central support member 22. The spring 35 serves to bias the second member 31 upwardly in a direction shown by the arrow 37. The member 41 has a projecting portion 38 formed at its closed end. Attached to the projection 38 is a manually operable element 39.

Figure 3:
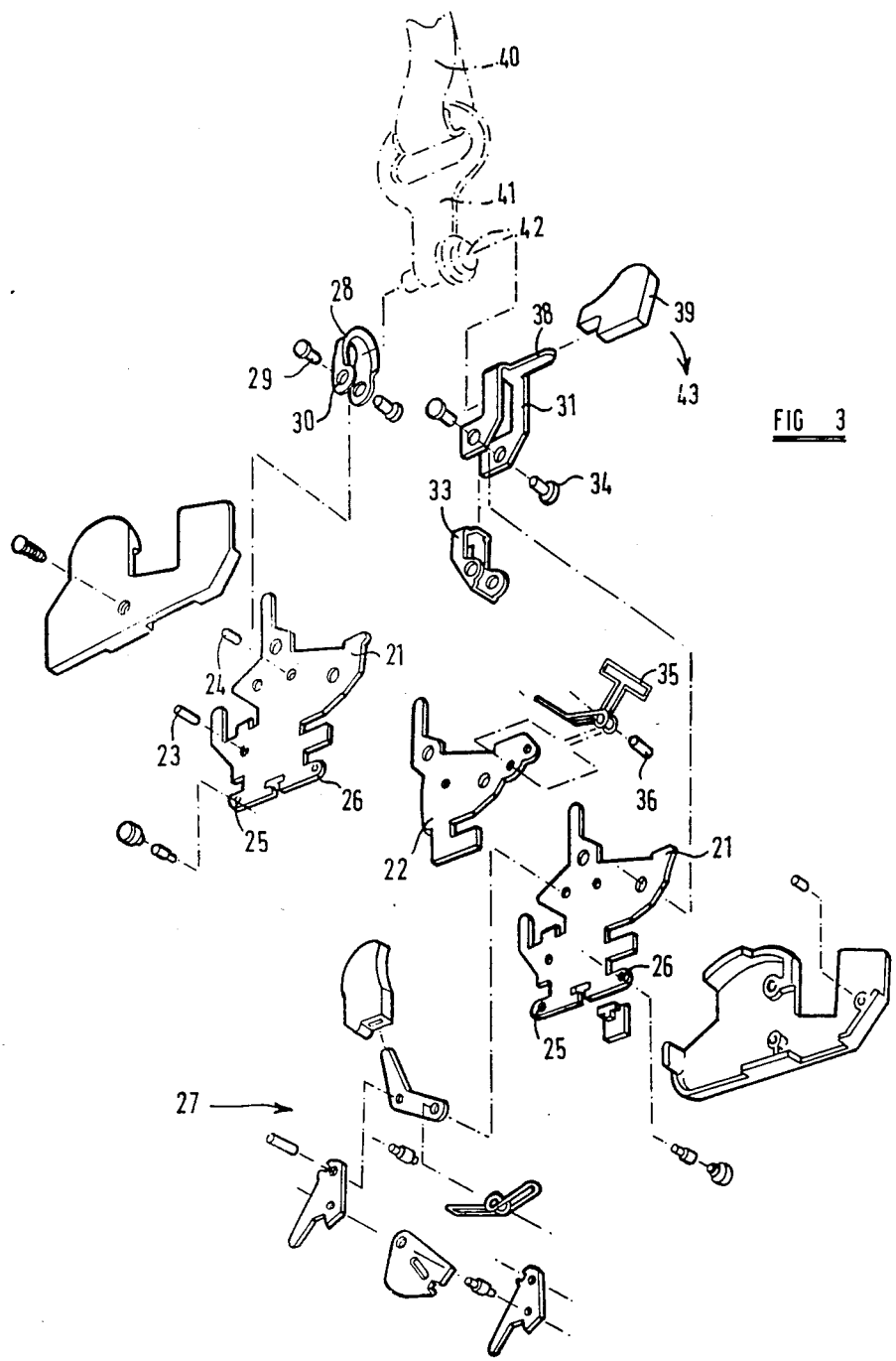
FIG. 3 is an exploded view of the embodiment shown in FIG. 2.

A seat belt 40, shown in FIG. 3, is provided with an attachment 41, hereinafter referred to as a first member 31, one end of which is in the form of a cylindrical stud 42, the ends of which define protrusions which locate under the loops of the members 28 and 31 when the seat belt is in use.

When the seat belt is in use the seat belt anchorage will initially be in the condition as illustrated in FIG. 2, with the stud 42 retained by the member 28 and the second member 31. The second member 31 is biassed into the position illustrated by means of the spring 35.

If it is wished to release the seat belt from the anchorage, the manually operable element 39 of the second member 31 may be moved downwardly, as indicated by the arrow 43, thus moving the second member 31 against the bias provided by the spring 35.

Once the second member 31 is released it will return to the position illustrated in FIG. 2 under the action of the spring 35. In order to reinsert the stud 42 between the members 28 and 31 the manually operable element 39 is depressed in the direction of the arrow 43, thus allowing the left hand protrusion of the stud 42 to be inserted under the member 28. The manually operable element 39 may then be released whilst the stud 42 and first member 41 are held in position. The second member 31 will then return to the condition illustrated in FIG. 2 under the influence of the biassing spring 35.

It is to be appreciated that, if desired, the member 28 may be spring biassed towards a released position, that is to say may be spring biassed to move in the direction of the arrow 44 by means of a leaf spring.

It will be appreciated that when support members as described above are utilised in a motor vehicle, the supports may be utilised at one end of the belt or, alternatively, may be used in a position on or adjacent the "B" post of a motor vehicle, in the case of a front seat passenger. In the event of an accident a rescuer may be able to obtain access to the second member 31, pivoting the second member to release the first member 41 from the member 28, thus releasing the seat belt. It may thus be possible to rescue a person rapidly from a motor vehicle, which may be very important, especially if a person is seriously injured, or if the vehicle catches fire.

Whilst various embodiments of the invention have been described it is to be understood that many modifications may be made without departing from the scope of the present invention.

I claim:

1. A seat belt anchorage installed in a motor vehicle, comprising a support member mounted adjacent a door of the vehicle, a first member, means for connecting the first member to the support member, the said first member being adapted to have part of the seat belt secured thereto or retained thereby, and a second member movably connected to the support member, having an initial position in which it engages the first member to retain the first member in a latched position in which it is secured to the support member, thus effectively connecting said part of the seat belt secured thereto or retained thereby to the support member, the second member being movable to a second position in which it releases the first member, thus permitting the said part of the seat belt to be disengaged from the support member.

2. A seat belt anchorage according to claim 1 wherein the said second member is pivotally mounted on the support member.

3. A seat belt anchorage according to claim 1 wherein the second member is spring biassed to the initial position.

4. A seat belt anchorage according to claim 1 wherein the support member is formed on a carriage movable along a track or rail mounted in a motor vehicle.

5. A seat belt anchorage according to claim 1 wherein said means for connecting the first member to the support member comprises a pivot pin or the like located adjacent one end of the first member pivotally connecting said one end of the first member to the support member so that a free end of the first member can pivot about a predetermined axis.

6. A seat belt anchorage according to claim 5 wherein the first member is spring biassed towards a released position.

7. A seat belt anchorage according to claim 6 wherein the first member has a cam surface which engages part of the second member when the first member is moved from the released position towards the position in which it is retained by the second member, thus moving the second member against the spring bias, the second member being adapted to move under the bias to the initial position again when the first member is in its retained position, so that the second member retains the first member.

8. A seat belt anchorage according to claim 6 wherein the means spring biassing the first member comprise a spring provided to engage the said pivotally mounted first member and the support member the spring being adapted to provide a rotational bias to the first member, biassing the first member towards the released position.

9. A seat belt anchorage according to claim 5 wherein the first member defines a channel extending between the pivoted end and the free end thereof, the channel being adapted slidingly to receive an element provided at one end of a seat belt to secure the seat belt to the said first member.

10. A seat belt anchorage according to claim 1 wherein said first member has a protrusion and said means for connecting the first member to the support means comprise means on the support member defining a socket or recess adapted to receive the protrusion provided on the first member.

11. A seat belt anchorage according to claim 10 wherein the means defining said socket or recess comprise a loop-shaped member which is secured to the support member the socket or recess being defined within said loop.

12. A seat belt anchorage according to claim 11 wherein said loop-shaped member is pivotally connected to the support member.

13. A seat belt anchorage according to claim 10 wherein the second member comprises means defining a socket or recess adapted to accommodate the protrusion provided on the first member.

14. A seat belt anchorage according to claim 13 wherein the second member consists of a saddle member which is pivotally connected to the support member, the saddle member being spring biassed towards said initial position by means of a spring engaging the saddle member and engaging the support member.

15. A seat belt anchorage according to claim 14 wherein the first member is spring biassed towards the release position by means of an ejector member which is pivotally mounted on the support member, and which is associated with a spring biassing means.

16. A seat belt anchorage according to claim 15 wherein the spring biassing means biassing the ejector is the same spring that biasses said second member.

17. A seat belt anchorage according to claim 1 wherein the support member comprises a single support plate.

18. A seat belt anchorage according to claim 1 wherein the support member comprises a plurality of adjacently located support plates.

19. A seat belt anchorage comprising a support member, an elongate first member, means connected to one end of said first member for pivotally connecting the first member to the support member, the said first member being adapted to have part of the seat belt secured thereto or retained thereby, and a second member movably connected to the support member, having an initial position in which it engages the first member to retain the first member in a latched position in which it is secured to the support member, thus effectively connecting said part of the seat belt secured thereto or retained thereby to the support member, the second member being movable to a second position in which it releases the first member, thus permitting the said part of the seat belt to be disengaged from the support member.

20. A seat belt anchorage in combination with a seat belt having a first end provided with a buckle and a second end, said anchorage being installed in a motor vehicle and comprising: a support member; a first member; means for connecting said first member to said support member for permitting movement of said first member relative to said support member between a released position and a latched position, said second end of said belt being directly retained by said first member at least when said first member is in said latched position; and a second member movably connected to said support means, having an initial position in which it engages said first member to retain said first member in the latched position in which it is secured to said support member, thus effectively connecting said second end of said seat belt to said support member, said second member being movable to a second position in which it enables said first member to move to the released position, thus permitting said second end of said seat belt to be disengaged from said support member.

21. A seat belt arrangement, said seat belt arrangement comprising a retractor reel, anchored in position, and a seat belt connected to the retractor reel to be wound on to and off the reel, the seat belt cooperating with seat belt anchorage at a position spaced from the reel, said seat belt anchorage comprising a support member, an elongate first member, means connected to one end of said first member for pivotally connecting the first member to the support member, the said first member being adapted to have part of the seat belt secured thereto or retained thereby, and a second member movably connected to the support member, having an initial position in which it engages the first member to retain the first member in a latched position in which it is secured to the support member, thus effectively connecting said part of the seat belt secured thereto or retained thereby to the support member, the second member being movable to a second position in which it releases the first member, thus permitting the said part of the seat belt to be disengaged from the support member.

* * * * *